United States Patent [19]

Anderson et al.

[11] Patent Number: 5,743,176
[45] Date of Patent: Apr. 28, 1998

[54] FRUIT AND VEGETABLE JUICE EXTRACTOR

[75] Inventors: David N. Anderson, Auburndale; Wayne C. Sherman, Lakeland, both of Fla.

[73] Assignee: FMC Corporation, Chicago, Ill.

[21] Appl. No.: 355,424

[22] Filed: Dec. 13, 1994

Related U.S. Application Data

[63] Continuation-in-part of Ser. No. 38,437, Mar. 29, 1993, abandoned.

[51] Int. Cl.[6] .................................................. A23N 1/00
[52] U.S. Cl. ....................................... 99/512; 99/513
[58] Field of Search ....................... 99/510, 511, 512, 99/513

[56] References Cited

U.S. PATENT DOCUMENTS

| | | | |
|---|---|---|---|
| 1,906,054 | 4/1933 | Freese | 99/512 |
| 2,109,048 | 2/1938 | Lorenzen | 99/512 |
| 2,409,497 | 10/1946 | Kessel | 99/511 |
| 2,541,084 | 2/1951 | Meier et al. | 99/511 |
| 2,545,159 | 3/1951 | McGihon | 99/510 |
| 2,995,165 | 8/1961 | Menne | 99/511 |
| 4,034,664 | 7/1977 | Hassell | 99/511 |
| 4,924,770 | 5/1990 | Raub | 99/510 |
| 5,207,152 | 5/1993 | Wettlaufer | 99/510 |
| 5,221,055 | 6/1993 | Kuan | 99/510 |
| 5,289,763 | 3/1994 | LeRouzie et al. | |
| 5,452,650 | 9/1995 | Lee | 99/510 |
| 5,479,851 | 1/1996 | McClean et al. | 99/512 |
| 5,495,795 | 3/1996 | Harrison et al. | 99/511 |

FOREIGN PATENT DOCUMENTS

| | | | |
|---|---|---|---|
| 0126738 | 2/1948 | Australia | 99/513 |
| 1224890 | 9/1966 | Germany | 99/512 |
| 0742343 | 12/1955 | United Kingdom | 99/511 |

*Primary Examiner*—David Scherbel
*Assistant Examiner*—James F. Hook
*Attorney, Agent, or Firm*—Ronald C. Kamp

[57] ABSTRACT

A point of sale juice extractor where diverse types of fruit to be processed are fed from a storage bin through an auger to a grater plate. The juice is released from the fruit at the grater plate and is centrifuged into a collector pan while the waste pulp by-product is discharged into a waste container.

2 Claims, 5 Drawing Sheets

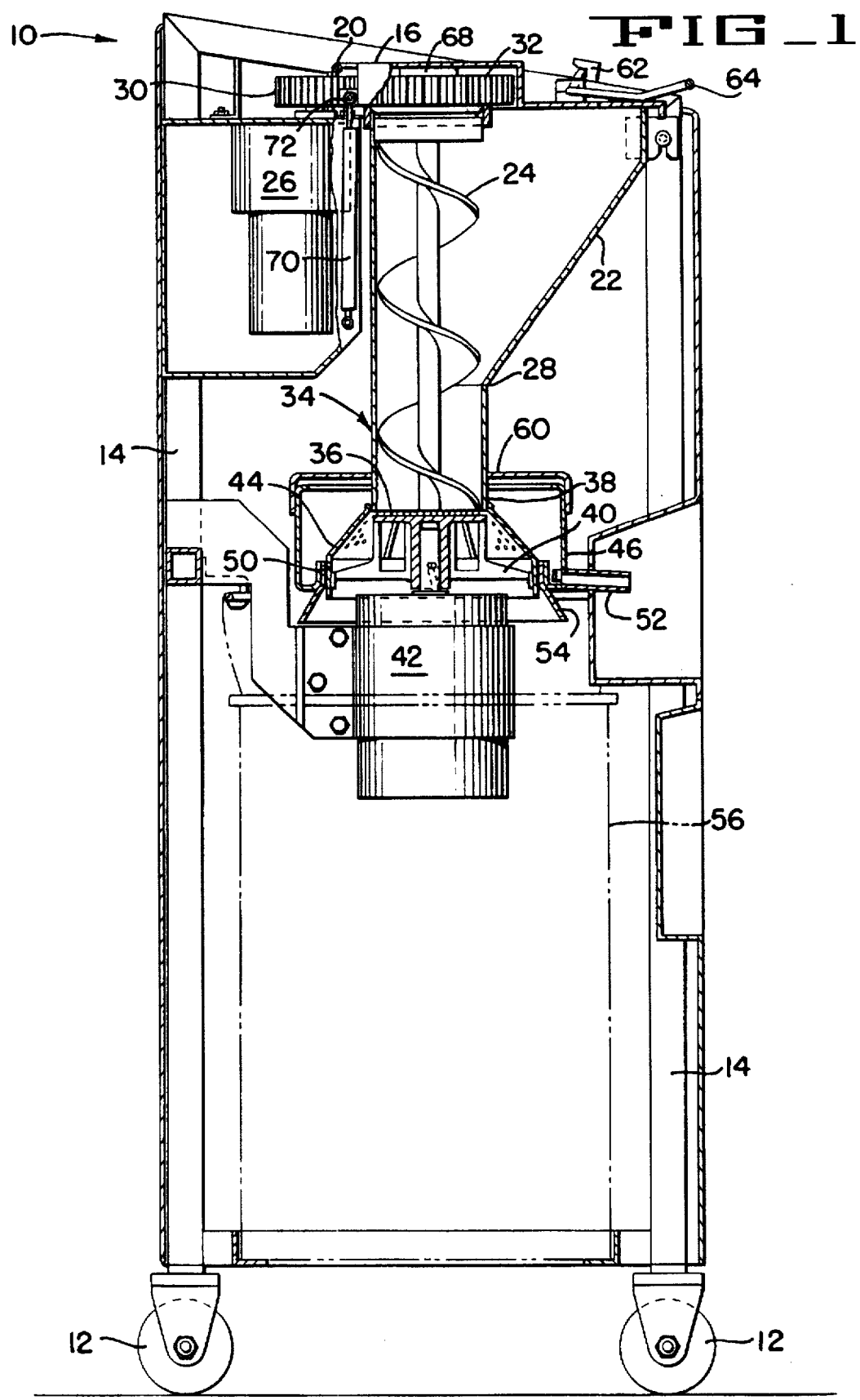

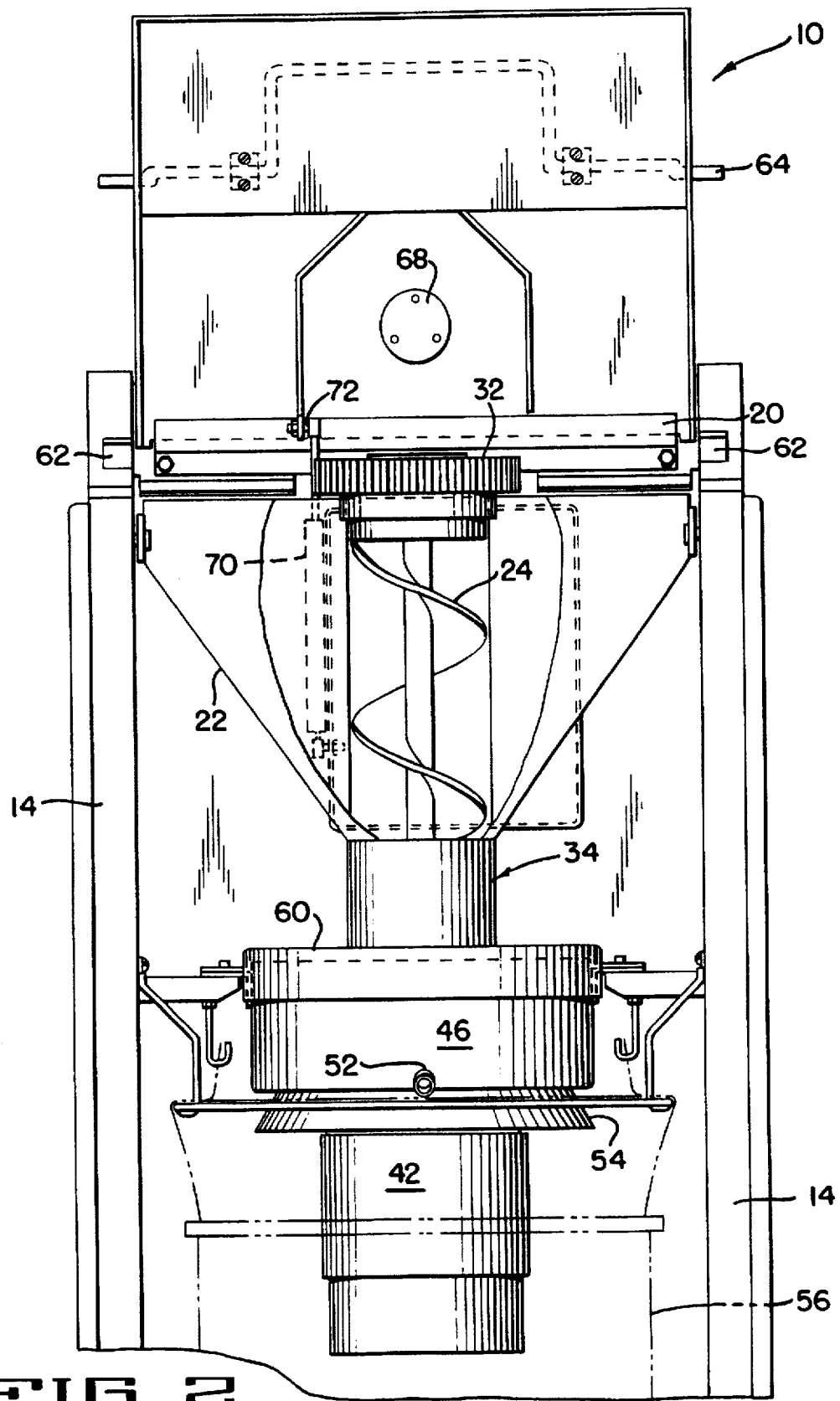
FIG_2

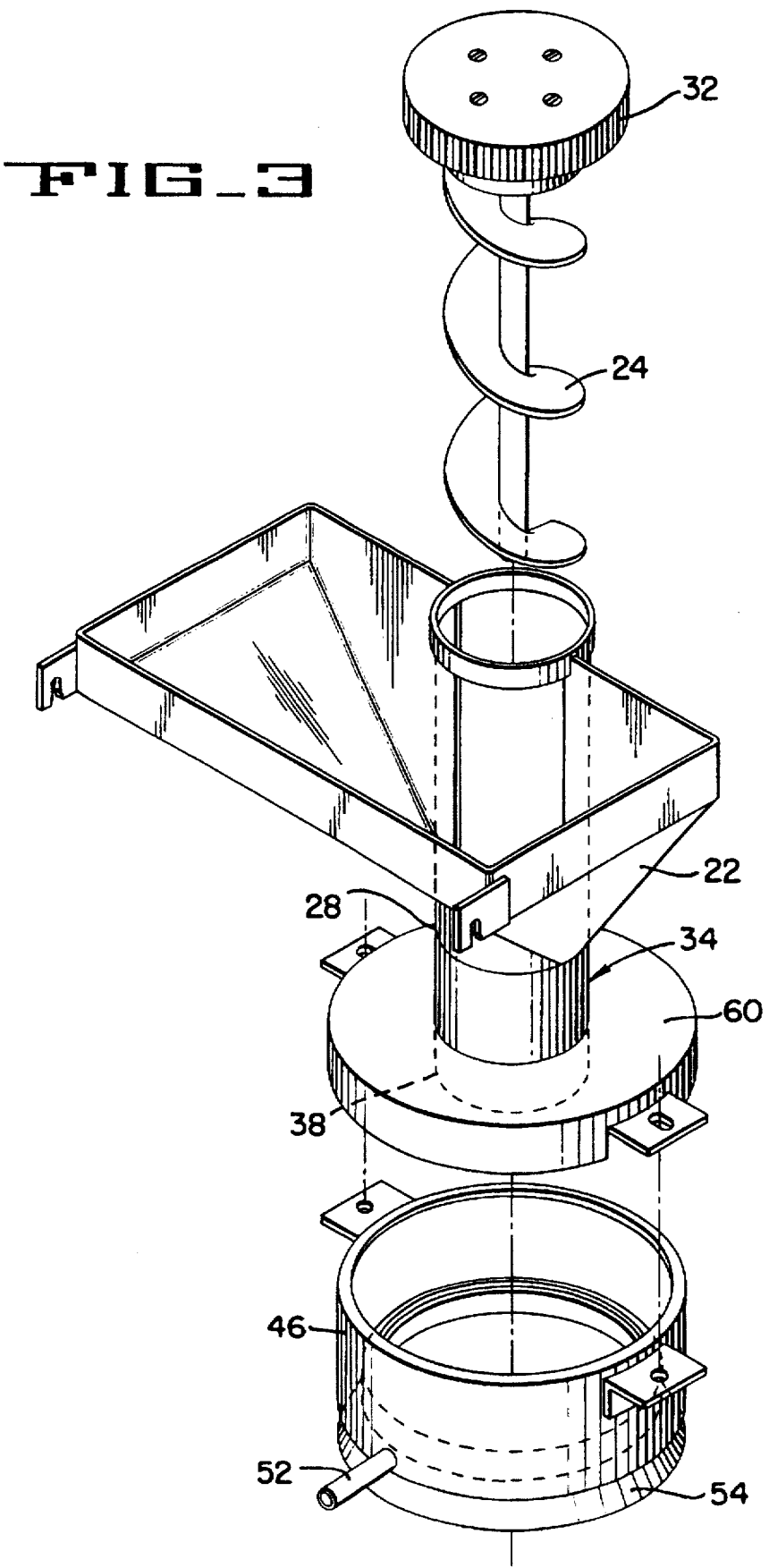

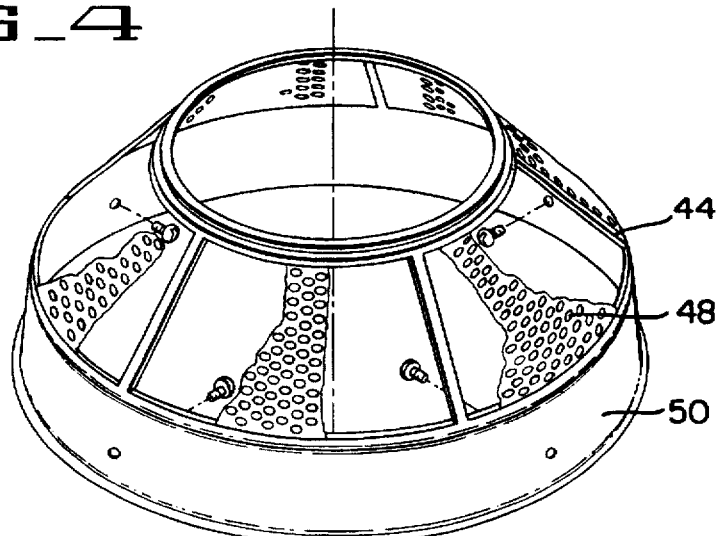
FIG_4
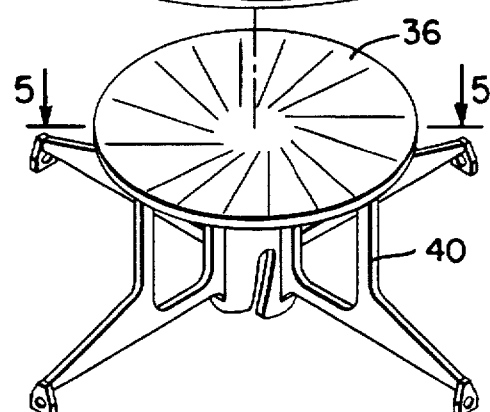
FIG_5
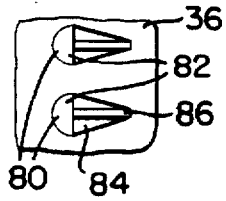
FIG_6
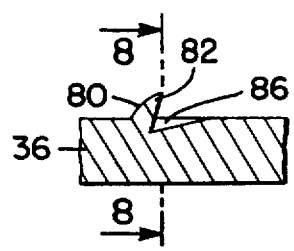
FIG_7
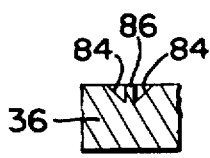
FIG_8

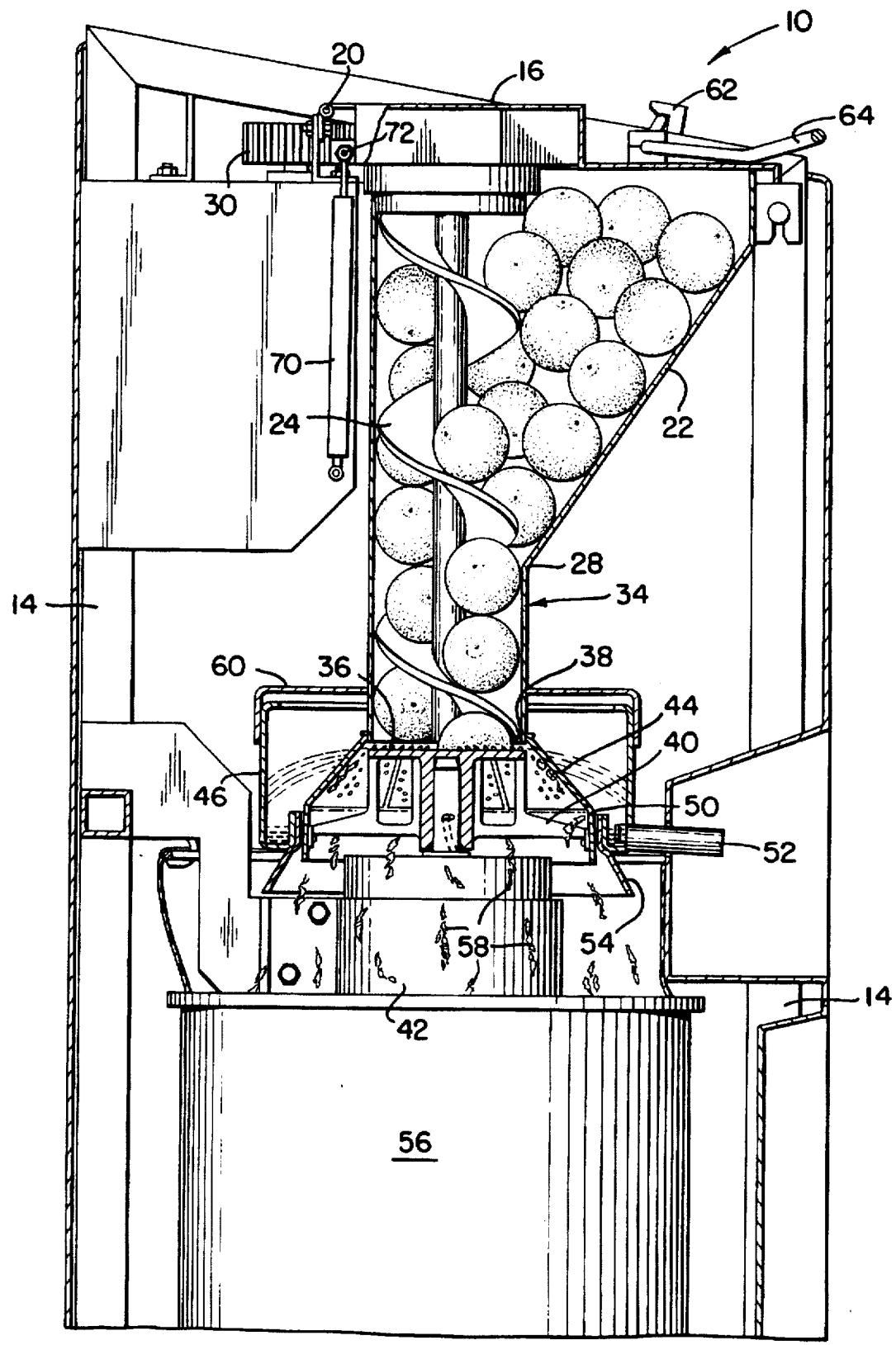
FIG_9

FRUIT AND VEGETABLE JUICE EXTRACTOR

This application is a continuation-in-part of application Ser. No 08/038,437, filed Mar. 29, 1993 now abandoned

BACKGROUND OF THE INVENTION

Field of the Invention

This invention has to do with juice extractors of the type for use in extracting juice from produce such as fruits and vegetables. It is a specific type of juice extractor that is designed for use in medium volume juice extraction operations such as road side stands, grocery stores, mobile vending operations and other fruit stands.

It is well known to provide so called point of sale citrus juice extractors in grocery stores and other fruit juice outlets. It is difficult to generalize about these units as there are several variations, however none of the point of sale multiple type juice extractors known to the inventors performs its function in the same way as the extractor provided herein. Home style juice extractors and juicers are not of the same character as the extractor presented herein. For instance, in some juice extractors the product to be juiced has to be trimmed or cut into manageable sized chunks before processing. Some machines require that leafy materials such as carrot tops and beet tops be cut off before the carrots or beets are run through the juicer. This invention, with its hopper feed and power driven feed screw, eliminates the cutting and trimming manual operation and lets the operator feed whole clean produce to the juicer.

Another advantage of this invention is that the centrifuge is mounted with the exhaust port directed downwardly. This enables the bio-mass from which the fluid has been extracted to fall, with the aid of gravity downwardly into a storage bin allowing generally continuous operation of the juice extractor.

Another advantage over the known juicers is that this invention includes a significantly large waste material storage bin that allows the unit to be continuously operated for a long period rather than operated in a slow batch process where pulp, seeds and other waste material need to be removed from the machine too frequently to perform in a grocery store or fruit stand in a productive manner.

SUMMARY OF THE INVENTION

A point of sale medium production quantity juice extractor for extracting juice from all manner of produce, from apples to zucchini, includes a bulk feed hopper. The hopper is associated with a motor driven feed screw that will unload the hopper and force the produce to be "juiced" against a spinning grater plate that abrades or scarifies the produce into a fine produce mass. The resulting produce mass is urged into a centrifuge below the grater plate where the juice is centrifuged out of the produce mass and the resulting moist but much drier bio-mass is discharged into a large volume bio-mass storage hopper. The process is generally continuous although the feed hopper will need to be refilled periodically and the bio-mass storage hopper will have to be emptied on a less frequent basis.

One object of this invention is to provide a juice extractor means for use in a commercial environment that includes a grater plate associated with a centrifuge to separate produce into a fluid component and a bio-mass containing a decreased amount of fluid.

BRIEF DESCRIPTION OF THE DRAWING FIGURES

The objects and advantages of this invention are disclosed in this specification and are shown in the drawing figures wherein:

FIG. 1 is a side elevation view of a juice extractor having some portions broken away to reveal the interior of the juice extractor;

FIG. 2 is a front elevation view of the upper portion of its juice extractor having some portions broken away to reveal the interior of the juice extractor;

FIG. 3 is an expanded view of the hopper and screw assembly of the juice extractor;

FIG. 4 is a depiction of the centrifuge portion of the extractor shown in FIGS. 1 and 2;

FIG. 5 is a plan is a plan view of the grater plate as taken through plane 5—5 of FIG. 4;

FIG. 6 is a representation of the cutter elements on the grater plate;

FIG. 7 is a cross section view of a cutter element taken through plane 7—7 of FIG. 5;

FIG. 8 is a cross section view of a cutter element taken through plane 8—8 of FIG. 7;

FIG. 9 is a side elevation view of the top portion of a juice extractor having some sections removed and sections to represent the juice extractor in operation.

DETAILED DESCRIPTION OF THE INVENTION

Looking first at FIG. 1 a representation of a juice extractor is shown. The unit, generally 10, is a generally rectangular box having a height that is about twice the depth or width of the unit. It is supported on wheels 12 that are affixed to a frame such as 14. The structure is generally covered with body panels that normally are in place to shield the interior components from outside access to thereby constitute a housing as shown in FIG. 1. Certain panels are easily opened for cleaning and service access. The hopper lid 16 may be hinged at 20 (FIG. 2) to provide access to the hopper 22. The various body panels and as many of the components as possible may be made of stainless steel for easy cleanup and resistance to corrosion. Certainly certain plastic and non-ferrous metals, as well as ferrous metals, can be selectively and interchangeable used as necessary or appropriate.

The fact that the unit shown is of a size that is appropriate for use in a commercial production environment—maybe about 4-½ to 6 feet high and 2 to 3 feet deep and wide is not critical to the invention. It is important to recognize that the inventor is not intending the unit for home use or for use in a full scale high volume high production juice plant. It is a midsize unit that is portable and could for instance be rolled around a super market, hospital or restaurant.

The mechanism of the invention includes a feed zone, a processing zone and a bio-mass storage zone.

In the feed zone, a hopper 22 is provided. Reference to FIG. 7 may be helpful here. It may have an open top covered by the hopper lid 16 and inclined sides that will allow produce—any type of fruit or vegetable for instance—to flow by gravity toward a screw 24. The screw 24 is a flighted rotary conveyor, generally deployed vertically, having a central axle and flights affixed to the central axle in a conventional and well known manner. The screw 24 may be driven by a drive means, motor means, gear motor or motor such as 26. A gear set 30 will allow motor output to drive the screw 24 as the gear set includes a gear 32 affixed to the top of the screw. It is expected that the screw will be rotated at a relatively slow speed but with sufficient torque to urge produce that it comes in contact with from the hopper 22 into a containment zone 34. The containment zone or means 34 is simply a close fitting wall, collar, or tube around the lower part of the screw 24 that serves to direct the produce out the bottom of the hopper against a grater plate 36. The containment means will have an infeed section 28 and a discharge end 38.

The grater plate 36 is a generally flat preferably stainless steel plate that could have serrations, cutting protuberances, upstanding scrapers, pins, needles, or the like that will cause produce that it contacts to be abraded, scored, sliced, chipped, scraped and otherwise degraded into relatively fine chucks, pieces and flowable material to form a produce mass of generally masticated material.

The grater plate 36 is best seen in FIGS. 5–8 wherein one type of serration 80 is shown. Many types of serration "teeth" are possible and the teeth shown have been used successfully by the inventor. The serration 80 includes an upstanding projection 82 that will bite into the produce and rip sections from the produce. A pair of shallow indentations such as 84 are formed in the grater plate in front of the upstanding projection 82. They may be separated by a wall 86 as shown. A plurality of serrations are formed on the upper surface of the grater plate as is shown in FIG. 5.

The interrupted lines in this figure indicate lines of serrations. The serration type as layout is not critical to the invention and any well known cutting serration could appear to be used. It is also believed that a perforated grating plate could be used such that produce mass could pass through the grater plate however the preferred embodiment is as shown in FIGS. 5–8.

The grater plate 36 may be backed and supported by a structural support 40 that not only prevents the plate from being distorted by the pressure of the produce urged against it by the screw 24 but also provides a structure attached to the grater plate that can be driven by a drive means 42.

The grater plate 36 drives means 42 will spin the grater plate 36 via the structural support at a relatively high speed in contrast with the produce urged out of the end of the containment means 34. The grater plate 36 will not normally contact the end of the screw 24. The drive means 42 may be a motor means such as an electric motor or other means as appropriate. It would not be unheard of to make this drive means 42, as well as the motor for the screw 26, a pneumatic drive, hydraulic drive, or even a manual drive although it is expected that an electric motor means in each location would be most realistic.

The drive means 42 also drives a centrifuge 44 while driving the grater plate 36 as the centrifuge perforated screen element is attached to the structural support 40.

The centrifuge 44 proximate the discharge end 38 of the containment means 34 as shown in FIGS. 1 and 9 includes a perforated screen portion 48, somewhat of an upside down cone in FIGS. 1, 4, 9 that surrounds the grater plate 36 and extends downwardly and outwardly from that plate. The perforated portion, which could be a multitude of holes in a membrane or a screen surface or the like, is a truncated cone that has a base greater in diameter than the upper portion of the truncated cone. The centrifuge includes the structural support 40 that also supports the grater plate 36. The structural support 40 will rotate at high speed, driven by the drive means 42, and fling produce mass made by the grater plate 36 against the perforated screen 44, which in the preferred embodiment shown will rotate with the structural support 40. The produce mass will at this point, due to the centrifuge action, give up a good percentage of its fluid. The fluid will escape through the perforations in the centrifuge screen 44 to be restrained in the collector pan 46.

As best seen in FIG. 9 the bio-mass (along with the fluid portion of the produce mass), such as 58 will fling against the perforated portion of the centrifuge and the fluid will escape through the perforations. The bio-mass however will continue down the interior of the perforated portion of the centrifuge and will eventually be sloughed off and fall by gravity into the storage bin means 56.

The collector pan is simply a vessel that fits tightly around the lower portion 50 of the centrifuge screen apron (which is a non-perforated section of the centrifuge screen) to surround the centrifuge and trap fluid being flung off the centrifuge screen 44. It would typically include a drain port 52 that could be fauceted or left open to allow discharge, normally into a container, of the fluid component of the produce that has been feed into the hopper, delivered by the screw to the grater means, masticated by the grater and then centrifuged.

As stated above, after the juice is separated from the produce mass the resulting bio-mass will drop out the bottom of the centrifuge, opening being shown as 54, into a storage bin means 56. The storage bin means 56 may be a removable bucket or container that can hold a significant amount of bio-mass. The idea is that the juice extractor can be run for a long time before the bin has to be emptied.

FIG. 3 is an expanded drawing representing and showing more clearly the relationship between the screw 24 and the hopper 22. Notice that the hopper 22 is associated with the screw 24 and in particular with the containment means 34. The containment means provides an extrusion tube through a cap 60 that may be fastened to the top of the collector pan 46. Not discussed above are the latch elements 62 which can interact with the latch bar 64 which is pivotally attached to the hopper lid 16. The latch bar and latch elements will connect when the hopper lid is closed and the latch bar is moved into latching position as shown in FIG. 9.

FIG. 2 shows that hinged hopper lid 16 may also include a barrier surrounding the gear 32 and the drive gear when the lid is closed. Item 68 is a beating surface that can contact the top of the screw 24 when the lid 16 is closed and will keep the screw from "backing out" when the lid is closed and the machine is running. Looking also at FIG. 1 an air cylinder 70 is shown grounded on the frame of the unit and pivotally mounted to the hopper lid at 72. This cylinder can assist in opening and holding open the hopper lid when the hopper is being filled by the machine operator.

In operation the hopper will be filled by the operator with the produce to be processed. The operator then turns on or plugs in the machine (plug and switch can be located anywhere on the machine and are not considered critical to the invention). The produce is then gravity fed into contact with the screw 24. The screw will urge the produce onto the grater plate means 36 where it will be masticated and pushed into the centrifuge section of the machine. The fluid will be centrifuged out and into the collector pan while the bulk or bio-mass material is dumped or dropped by means of gravity into the bin 56. Fluid will be drawn off through the drain or spigot as necessary.

It can be seen from the above specification and the drawings that a juice extractor having the advantages and objects set forth above has been disclosed.

Although the best mode contemplated for carrying out the present invention has been herein shown and described, it will be apparent that modification and variation may be made without departing from what is regarded to be subject matter of the invention.

What is claimed is:

1. Apparatus useable in the mid-size market for extracting juice from vegetables and fruit comprising:

a frame a motor mounted on said frame and having an upwardly directed output shaft;

a backer mounted on and driven by said output shaft;

a grater plate supported by said backer and rotatable therewith;

a containment tube positioned essentially vertically above said grater plate and having a lower discharge end in close proximity to said grater plate;

a screened centrifuge secured to said backer and rotatable therewith;

said centrifuge having a frusto-conical section with a larger end and an upper smaller end encircling said tube just above the lower end thereof;

said grater plate being positioned substantially horizontal and adjacent the upper end of the centrifuge so that material abraded by said grater plate is immediately thrown against said centrifuge;

a flighted screw rotatable within said tube;

drive means for rotating said screw at a slower speed than said grater plate and in a direction to cause said screw to force fruit or vegetables against said grater plate;

a hopper for holding fruits and vegetables and in communication with said tube so that fruits and vegetables may be continuously supplied to said screw;

a collector pan surrounding the centrifuge to collect juice passing therethough; and a hopper removable even during operation of the apparatus positionable below the larger end of said centrifuge to collect the remains of said fruits and vegetables as they drop from said centrifuge.

2. The apparatus according to claim 1, and further comprising:

a lid pivotally mounted to be moveable between an open position in which the top of said hooper is exposed for loading with fruits and vegetables and a closed position; and a bearing surface affixed to said lid and engageable with said screw when said lid is in a closed position to react the thrust of said screw during operation.

* * * * *